Figure 1:
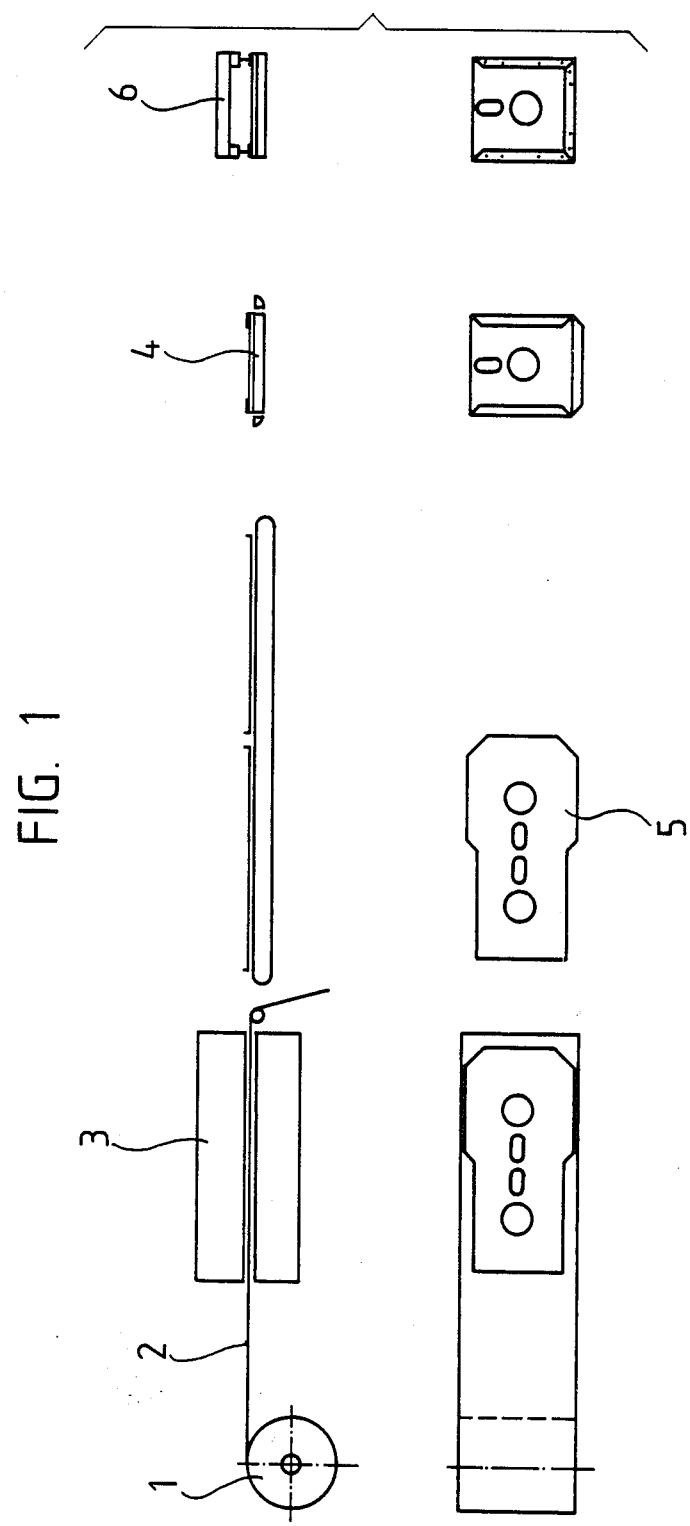

United States Patent [19]

Lenz et al.

[11] Patent Number: 4,733,452
[45] Date of Patent: Mar. 29, 1988

[54] PRODUCTION OF JACKETS FOR FLEXIBLE MAGNETIC DISKS, AND APPARATUS FOR THIS PURPOSE

[75] Inventors: Bernhard Lenz, Rheinmuenster; Norbert Holl, Battenberg; Dietrich Gruehn, Appenweier; Kurt Zwintzscher, Willstaett, all of Fed. Rep. of Germany

[73] Assignee: BASF Aktiengesellschaft, Ludwigshafen, Fed. Rep. of Germany

[21] Appl. No.: 873,536

[22] Filed: Jun. 12, 1986

[30] Foreign Application Priority Data

Jun. 14, 1985 [DE] Fed. Rep. of Germany ....... 3521383

[51] Int. Cl.4 .................. B21D 39/03; B23P 19/00
[52] U.S. Cl. .......................................... 29/428; 29/700; 29/791; 156/477.1; 219/87; 219/538; 264/248; 425/174.4

[58] Field of Search ............. 219/538, 542, 86.1, 219/87; 425/174.4, 174.8 E; 264/26, 248; 360/39, 99, 98; 156/477.1; 29/428, 700, 791

[56] References Cited

U.S. PATENT DOCUMENTS

| | | | |
|---|---|---|---|
| 3,265,551 | 8/1966 | Ananian et al. | 264/26 |
| 4,038,693 | 7/1977 | Huffine | 360/99 |
| 4,490,765 | 12/1984 | Nakamats | 360/99 |
| 4,573,572 | 3/1986 | Kato et al. | 360/99 |
| 4,617,081 | 10/1986 | Bleau et al. | 156/477.1 |

Primary Examiner—Howard N. Goldberg
Assistant Examiner—Ronald S. Wallace
Attorney, Agent, or Firm—Keil & Weinkauf

[57] ABSTRACT

The jacket blanks punched out from a film web are folded to give jackets and then closed by spot welding with the aid of a wavy resistance belt, the welding temperature being produced for a short time by means of a current pulse in the resistance belt.

4 Claims, 2 Drawing Figures

PRODUCTION OF JACKETS FOR FLEXIBLE MAGNETIC DISKS, AND APPARATUS FOR THIS PURPOSE

The present invention relates to a process for the production of jackets for flexible magnetic disks, in which jacket blanks are punched out of a web of film material, those surfaces of the blanks which are intended to be the inner surfaces of the jacket are covered with a nonwoven fabric, the individual blanks together with the nonwoven fabric are then folded into jacket form, and those parts of the blank overlapped in this procedure are connected to one another via tabs by welding, the magnetic storage disk being inserted into the jacket before the end tab is closed.

The present invention furthermore relates to an apparatus for carrying out the production process, the said apparatus essentially consisting of a punching unit for producing jacket blanks from a film web, a unit for folding the blanks into jacket form and a support surface for the jacket to be welded, as well as a welding strip which is arranged above this, is connected to a welding current source and can be driven toward the supporting surface by means of a movable holder.

In the production of jackets containing a flexible magnetic disk, which are known as floppy disks to those skilled in the art, the welded joints of the jacket parts have been produced to date using electrically heated strips which produce a weld joint over an area. During the relatively long welding time of about 1.5–2.0 seconds required for the surface, at a welding temperature of from 180° to 220° C., a large amount of heat energy is transferred to the entire jacket, this transfer being promoted by the relatively large transfer surfaces and the fact that other parts of the apparatus are also heated up during the welding operation. When the jacket has been cooled in a further stage of processing, stresses usually remain in the jacket material and frequently result in deformation of the jacket so that the magnetic disk can no longer rotate freely in the jacket. The long welding time is also an obstacle in manufacturing plants employing a fast operating cycle.

It is an object of the present invention to avoid the disadvantages described above by improving the production of the jacket for magnetic disks, which has been described at the outset, in such a way that heat transfer to the jacket is substantially prevented and a reliable weld joint for the jacket parts can be produced in a shorter time than hitherto.

We have found that this object is achieved, according to the present invention, if the weld joints are produced in the form of a large number of spot welds by producing the welding temperature in a pulse-like manner.

The apparatus, described at the outset, for carrying out the production process is equipped with a welding strip, which, according to the invention, consists of an electrical resistance belt which has a wavy shape, forms spot-like weld surfaces and is fastened to the holder via a thermal insulation.

The production process according to the invention and the apparatus for this process are described in detail below with reference to an illustrative example shown schematically in the drawing.

Figure 2:
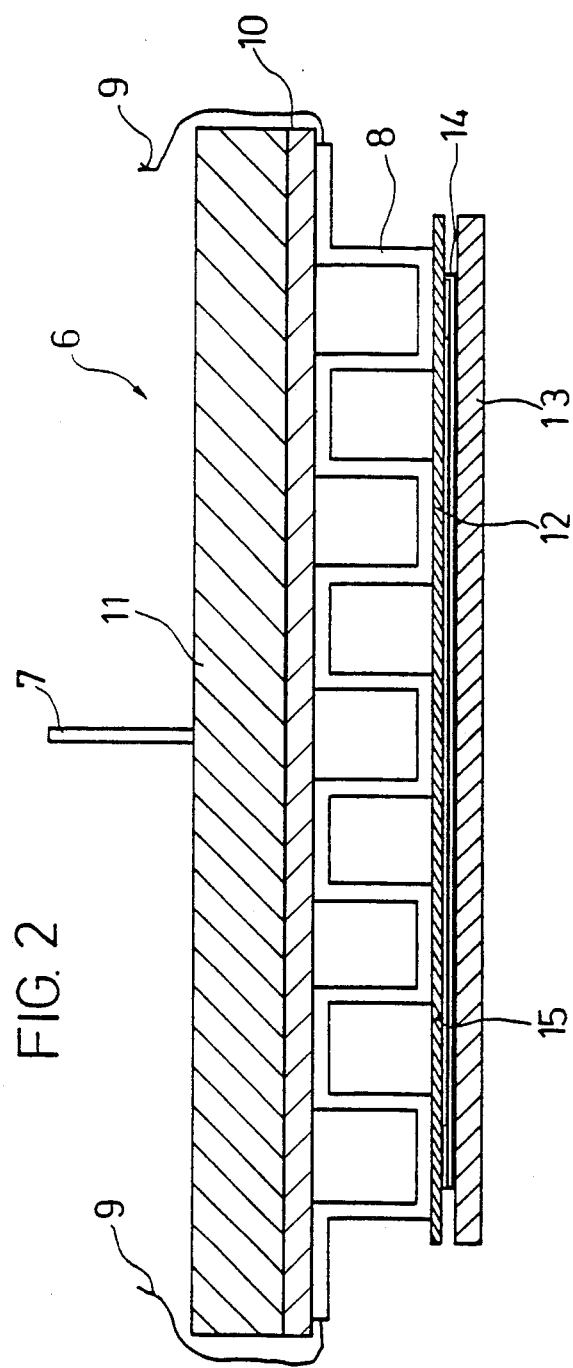

FIG. 1 shows schematically the individual production stages, with a punching apparatus, a folding apparatus and a welding apparatus for the jacket blanks and FIG. 2 shows schematically the novel welding apparatus for the jacket parts to be joined.

The blanks for the jackets of flexible magnetic disks are punched out from a film web, their functional openings too being punched out during this procedure. The blanks are covered, on the surface intended to be the inside surface of the jacket, with a nonwoven fabric which serves to clean the disk rotating in the jacket during read/write operation. For this purpose, a web of nonwoven fabric is combined with the film web prior to punching and is attached to the film web by spot welding. The individual blanks are folded mechanically into jacket form and are processed to produce a closed jacket by a procedure in which the jacket parts which have been caused to overlap are welded to overlapping tabs. The magnetic disk is inserted into the jacket beforehand, with the end tab open.

The conventional production stages described above are illustrated schematically in FIG. 1, which shows a stock roll 1 of the film web 2, a punching apparatus 3, a downstream folding apparatus 4 for the blanks 5, and finally a welding apparatus 6 for the folded blanks. Since, with the exception of the novel welding apparatus, the individual apparatuses are available commercially, they need not be described in detail here.

According to the invention, the welding apparatus (FIG. 2) is provided with a welding strip which consists of a wavy resistance belt 8 about 0.3–0.6 mm thick, which is connected to a current source 9 and fastened to a holding rail 11 via a thermal insulation 10, for example an epoxy resin. The wavy shape can be produced, for example, by erosion of a suitable metal belt, for example one consisting of stainless steel, the projecting belt parts forming point-like welding surfaces 12 which have exactly defined edges and appear as surfaces in the drawing, owing to the enlarged scale.

The holding rail 11 with the resistance belt 8 can be driven, by means of a rotatable or displaceable bearing and with the aid of a suitable drive 7, for example a working cylinder or mechanical curve (not shown in the drawing), toward a support surface 13 which holds the folded jacket blank 14. It has proven advantageous to provide the welding surfaces 12 with a thin covering 15 (about 0.1–0.2 mm thick) of PTFE-glass fabric so that the jacket material, which is plastified during welding, does not remain adhering to the welding surfaces 12.

After the resistance belt 8 has been lowered onto the jacket blank, the welding current source is switched on for a short time so that a current pulse which has a duration of about 0.1–0.3 sec and, for example, a level of 35 A at a voltage of 8 V generates a welding temperature of about 250°–300° C. at the individual welding points. The holding strip 11 with the resistance belt is then raised again in order to remove the finished jacket.

Because the welding temperature is maintained for a very short time, heat transfer to the jacket and to the other parts of the apparatus is avoided. Moreover, because of the shorter welding time, the manufacturing cycle can be accelerated.

We claim:

1. A process for the production of a jacket for flexible magnetic disks, which includes the steps of punching jacket blanks out of a web of film material, covering those surfaces of the blanks which are intended to be the inner surfaces of the jacket with a nonwoven fabric, then folding the individual blanks together with the nonwoven fabric into jacket form, and joining those parts of the blank overlapped in this procedure to one another via tabs by welding, and inserting the magnetic storage disk into the jacket before the end tab is closed, wherein the welding temperature for each weld joint is produced, by resistance heating, through the formation, for a short duration, of a large number of spot welds at spatially separated points of said joint.

2. The process as claimed in claim 1, wherein the welding temperature produced is 250°–300° C. and wherein the spot welds are produced for a duration of about 0.1–0.3 second.

3. Apparatus for the production of a jacket for flexible magnetic disks, in which jacket blanks are punched out of a web of film material, those surfaces of the blanks which are intended to be the inner surfaces of the jacket are covered with a nonwoven fabric, the individual blanks together with the nonwoven fabric are then folded into jacket form, and those parts of the blank overlapped in this procedure are joined to one another via tabs by welding, the magnetic storage disk being inserted into the jacket before the end tab is closed, and the welding temperature for each weld joint being produced, by resistance heating, through the formation, for a short duration, of a large number of spot welds at spatially separated points of said joint, said apparatus comprising a punching unit for producing jacket blanks from a film web, a unit for folding the blanks into jacket form and having a support surface for the jacket to be welded, and a welding strip which is arranged above said jacket and is electrically connected to a welding current source, and means for driving said welding strip toward the support surface with the aid of a movable holder, the welding strip consisting of a wavy electrical resistance belt which forms point-like weld surfaces and is fastened to the holder via a thermal insulation.

4. Apparatus as claimed in claim 3, wherein the point-like welding surfaces are provided with a thin covering of Polytetrafluoroethylene-glass fabric or a similar material.

* * * * *